United States Patent [19]

Pedersen et al.

[11] Patent Number: 5,370,746
[45] Date of Patent: Dec. 6, 1994

[54] PROCESS AND APPARATUS FOR CLEANING SMALL DIAMETER CLOGGED HOLES

[75] Inventors: Benny Pedersen; Kurt Sihm, both of Esbjerg, Denmark

[73] Assignee: O & J Hojtryk A/S, Esbjerg, Denmark

[21] Appl. No.: 834,269

[22] PCT Filed: Aug. 15, 1990

[86] PCT No.: PCT/DK90/00207
§ 371 Date: Feb. 18, 1992
§ 102(e) Date: Feb. 18, 1992

[87] PCT Pub. No.: WO91/02600
PCT Pub. Date: Mar. 7, 1991

[30] Foreign Application Priority Data
Aug. 16, 1989 [DK] Denmark .................... 4017/89

[51] Int. Cl.$^5$ ................... B08B 3/02; B08B 9/00
[52] U.S. Cl. .............................. 134/22.1; 134/18; 134/22.18; 134/24; 134/57 R; 134/58 R; 134/153
[58] Field of Search ............ 134/22.12, 22.18, 18, 134/29, 32, 33, 34, 42, 57 R, 153, 58 R, 152

[56] References Cited

U.S. PATENT DOCUMENTS

| | | | |
|---|---|---|---|
| 3,608,567 | 9/1971 | Neill, Sr. ................... | 134/33 |
| 3,799,178 | 3/1974 | Anderson et al. ........... | 134/153 |
| 3,840,402 | 10/1974 | Tobin, III ................... | 134/34 |
| 4,299,245 | 11/1981 | Clapper ........................ | 134/152 |

OTHER PUBLICATIONS

A single sheet of paper reciting "Example Applications" of remote pipeline cleaning/dehydrating (best available copy). Author: Orlanda Sivacoe Date: May, 1991 Place of Publication: Canada.

*Primary Examiner*—Melvyn J. Andrews
*Assistant Examiner*—Saeed T. Chaudhry
*Attorney, Agent, or Firm*—Antonelli, Terry, Stout & Kraus

[57] ABSTRACT

A cleaning process and apparatus for cleaning small diameter clogged holes or passages fashioned as deep through-holes or small diameter through-holes of varying sizes. The holes may be provided in dies for enabling a pressing of materials for manufacturing of pellets such as feed stuff pellets. The cleaning is effected by directing at least one water jet having a diameter less than one-half of a smallest diameter of the hole or passage to be cleaned. The cleaning medium is supplied possibly at supersonic speed. It is also possible to clean radially oriented holes or passages in the die by ejecting the cleaning medium from nozzles of the apparatus.

10 Claims, 4 Drawing Sheets

PROCESS AND APPARATUS FOR CLEANING SMALL DIAMETER CLOGGED HOLES

FIELD OF THE INVENTION

The present invention relates to a cleaning process and an apparatus for cleaning of clogged holes or passages of a small diameter such as, for example, through holes of a constant diameter or through holes of varying sizes and, in particular, holes provided in dies having a large number of such holes-for through pressing of materials during the manufacturing of pellets, such as dies employed during pelletizing of feed stuff pellets.

Without limiting the invention to dies for pelletizing of feed pellets, in the following description, for the purpose of simplicity and only for exemplifying the invention is described mainly with reference to dies of the aforementioned type.

BACKGROUND OF THE INVENTION

Pelletizing dies of the aforementioned type may have an axial length of 0.15-0.25 m and a diameter of about 0.4-0.6 m and may be fashioned as cylindrical elements of steel having a material thickness of about 0.5-0.15 m provided in a radial direction with a large amount of drilled through holes or passages having a diameter of about 1.3-10 mm.

Generally the holes or passages are drilled, from the periphery of cylindrical elements by a precisely guided drilling machine, with the holes or passages being distributed so that the holes are mutually spaced, with the spacing between the holes or passages being about two to three times their diameters, whereby the holes or passages, having their axes radially oriented, are distributed along several an annular rings encircling the cylindrical periphery of the die elements, for example, a hundred holes may be contained within each of twenty-forty-five annular ring formations encircling the die elements. The dies are employed for pelletizing, most often in the manner, that two or three cylindrical rolls at a distance of about 0.5-1 mm are arranged rolling against an internal surface of the cylindrical dies. A material to be pelletized, for example, a feed stuff powder, is supplied to the spacing thus arranged between the rolls and the inner surface of the die while they roll against each other. By application in this manner of a great pressure on the feed stuff powder, the powder is pressed through the single die holes or passages and is shaped into thin bars, which, by suitable cutting means are cut into suitable lengths at the outside of the die. With a die of the aforementioned size, which, for example, comprises 10,000 holes, each having a diameter of about 3 mm, five to ten tons of feed stuff may pass through the die per hour.

Experience shows that, in the course of time, unavoidably more and more of the holes or passages become clogged resulting in a reduction in the production and resulting in unwanted down time in the production, whereby the production down time may cause further clogging of the holes or passages in the dies to take place. Much of the clogging of the holes or passages is caused by small pieces of metal which, in one way or another, are present in the feed stuff mixture. However, partially clogged peripheral portions of the dies may have been caused by utilizing erroneous feed stuff mixtures or through an undesirable wearing of countersunk input ends of the die holes, which counter sinking was provided during the manufacturing of the dies.

Clogging may also be the result of the deforming of the feed stuff input ends of the holes by the pressing rolls because of application of a too large pressure by the pressing rolls when the pressing rolls during manufacture of the feed stuff pellets, are being pressed against the inner side of the dies, etc. Dies causing reduced production have to be exchanged with dies giving optimum production. As the dies are rather expensive, it is desirable to restore or repair the dies.

Up to the present time, this restoring of the dies has been accomplished by a simple drilling process taking place by means of manually guided drilling machines, since this manner of restoring the dies is more efficient than using a pillar drill because pillar drills leave more broken drills unremovable stuck in the die holes as compared with the result when using a manual restoration process.

When employing the dies for pelletizing, the individual holes are worn down in a way which results in the holes being conically shaped having the conical shape with its largest diameter at the feed stuff material input end of the holes or passages. While the manual drilling process is rather slow, since the dies are expensive, it is less expensive to effect manual drilling operations than to replace the dies. In this connection, it should be noted that a problem exists in avoiding a deteriorating of the shape of the holes during a restoring or repairing of the dies since it is important to get the internal surfaces of the holes or passages as even as possible. This has shown itself to be difficult. When putting dies into operation, the suitable hole or passage polishing means is first often passed through the dies, or a feed stuff mixture with such properties is at first forced through the die holes or passages when attempting to restore or repair the dies.

To clean the dies, a manual washing has been tried, but, the washing water must be applied with so strong a force that is required to effect manual washing, that it is not possible to control the water application nor, the force applied to the washing water jet nor to achieve a noticeable washing by only simple means.

Experience has, on the other hand, shown, that if very large water pressures are used, for example, greater than 400 bar, then it is possible to achieve or rather to force an effective cleaning of such clogged holes or passages so that the net result is that only a few or practically no holes or passages remain clogged after a cleaning in this manner.

To achieve a sufficiently inexpensive restoration of such clogged dies, a high degree of mechanization has to be provided for because it, in practice, is not possible, with simple means as through manually or visually guiding of the water jet to obtain a satisfactory positioning of and also satisfactory direction of such a powerful water jet towards the hole or passage to be cleaned to achieve a cleaning of the holes or passages to take place.

Moreover, as short a time span as possible has to be spent for carrying out of the positioning of the water jet to be directed towards the hole or passage to be cleaned. Moreover, such water jet has a tendency of its own to positionally by itself to become or to remain locked somewhere along its path when trying to move it. This evidently is due to the fact that such a type of water jet in this case exhibits the same inherent property as that which is known from an upwardly directed broad jet of water, which is able to carry on its top, as rotationally shaped objects or bodies, such as evenly shaped ball members without loosing them from the jet. It must be admitted that the first trials of handling such a powerful water jet were more or less carried out as experiments without at first realizing the practical results, but, further experiments including trials with fast positionings and with suitably fast position adjusting of the water jet direction and, in general, by one step right-position-acquiring of the water jet, did indicate that it in someway was possible, without doing any damage due to the water jet to the hardened steel material of the die, to move or to displace a thin water jet of this powerful type from one hole or passage into a neighboring hole or passage for a cleaning of the holes or passages.

If a displacing of the jet is made too short, then the water jet exhibits a tendency to be locked in position at the middle of the material wall between the two holes or passages. On the other hand, if the new hole or passage to be cleaned is made to be hit or impinged upon by the water jet using sufficiently fast speed of displacement then, the water jet will lock at the center of the hole or passage. This locking is due to the effect that water returning from the spot being met by the approaching water jet at the displacement operation and later when the displacement is being finished. It has later been found that a cleaning is achieved when the water jet of the above mentioned pressure has a suitable small diameter, that is somewhat less than the diameter of the hole or passage, with an optimum for the water jet diameter being approximately one-half the diameter of the hole or passage. The cleaning water jet thus has to keep itself locked to the hole or passage which is being cleaned, also in the case that this hole or passage only is able to be cleaned by means of the water jet for a fraction of its length. On the other hand, a very high water pressure has to be present. Holes or passages which are clogged with feed stuff are cleaned fairly quickly, with the feed stuff leaving the holes or passages in a bullet-like manner. Severely clogged holes may require a longer time, for example, several seconds with such water jet treatment before a complete cleaning is attained. On the other hand it must be remembered that the number of holes or passages is very large.

Experience shows that the thin cutting jet apparently does not damage the die material, On the other hand, the energy which is supplied to the water jet and to the maintaining of the water jet is considerable and, for example, 50–75 kw are required for a water jet of 1–3 mm in diameter, resulting in a powerful heating of the water is taking place. Due to the heating of the water, the water. before possible reuse first has to be led to a suitable storage tank and necessarily has to be cooled.

SUMMARY OF THE INVENTION

According to the invention, summarizing, the procedure or process for cleaning of holes or passages as described above is substantially applicable for objects with clogged holes or passages such as, for example, dies, which are able to be located on a suitable supporting means comprising holding means for fastening such a die with respect to a water jet means, wherein the holding means comprises activatable position adjusting means for adjusting or readjusting the fastened mutual fixedly held die to a lesser degree, possibly by means of a minor flexibility and/or spring induced flexibility so as to provide a limited fastening. The mechanical accuracy of this adjusting means has to be of such a size that its size lays within one-half or less of the smallest hole or passage diameter when the diameter of the water jet has a size less than one-half of the smallest hole or passage diameter and whereby the water jet is directed against the first hole or passage to be cleaned, with the direction of the water jet a substantially corresponding to a longitudinal direction of the hole or passage.

The thus limited degree of fastening or fixing between the supporting means and the die is according to the present invention, maintained to such an extent that the flexibility of the fastening permits, relatively, a mutual moving between the die and the supporting means which is less than one-half of the diameter of the smallest hole in the die to be cleaned.

A detecting means is disposed behind the hole or passage for detecting the arrival of water or clogged material from an end of the hole, with the detecting means activating a memory means so as to result in either a stopping of the cleaning operation or in a mutual displacing taking place through activation of the position adjusting or readjusting means for the water jet, with the mutual displacing corresponding to the mutual spacing between the center of the cleaned hole or passage and the center of the next hole or passage to be cleaned and with an accuracy of the displacement being greater than one-half of the smallest hole or passage diameter, and with the water jet being substantially directed towards the hole or passage in the longitudinal direction of the hole or passage.

The above described process continues and the degree of mutual fastening or fixation between the supporting means and the die is maintained to such a degree that the flexibility of the fastening or fixation permits a relative mutual moving between the supporting means and the die which is less than one-half a diameter of the smallest hole in the die to be cleaned.

It is understood that, in accordance with the present invention, other types of media other than water may be used for the jet.

In this connection, it is to be understood that, in principle, the water jet may be replaced by a drilling means, and steps of the process which thus are influenced here through may be carried out as the first and the last steps of the process.

According to the present invention, it is thus foreseen that the process steps may be applied to a process by which the water jet is substituted with a drilling or cleaning means which solely is capable of performing a cleaning of the area at one end of the holes or passages, with the detecting means being provided so as to enable a detection of a termination of a cleaning of the single areas of ends of the respective holes or passages.

It is to be noted, that these process steps as well may relate to cleaning of the same end or opposite end of the holes or passages to be cleaned through the use of the invention.

Additionally, according to further features of the present invention, the cleaning water jet may be adapted to clean in a usual direction as well as in an opposite direction through the holes or passages.

Furthermore, according to the invention, the cleaning water jet, under an extremely high pressure, is emitted from the nozzle and is discharged from the nozzle at approximately supersonic speed with respect to the surrounding atmosphere around the area to be cleaned. Though it is to be admitted that conditions may be thought of where the problems which are to be solved by the invention are met at water jets or jets of other media where the particles of the jet assume much smaller speeds.

According to further advantageous features of the present invention, in particular, with an unsuccessful cleaning, to terminate or stop the cleaning operation, the memory means may be provided with a means which, at non-detecting of emissions of water and/or clogging materials from the respective holes or passages or non-terminated cleaning of the hole or passage area, at the lapse of a certain period of time of operation, to release a signal continue a following process step or to halt or stop the operational routine.

A further development or process according to the invention resides in the fact that the elapse of the time period of operation, with water as a cleaning medium, is ten-thirty times greater than the expected operational cleaning time per hole or passage.

Moreover, the memory means according to the present invention may comprise means to upcount and/or to determine a frequency of appearing non-fulfilled or unsuccessful cleanings of holes or passages and to provide an alarm of error conditions and, possibly, to issue signals for stopping the cleaning operation.

According to the present invention, a die or other device with holes or passages to be cleaned may be arranged in two or more different apparatuses provided for the different types of hole or passage cleaning means, with at least one of the holes or passage cleaning means being a water jet cleaning means.

In accordance with the apparatus of the present invention, at least one apparatus is arranged in more than one plane and comprises step-moving means including possibly lift-and-turn-step-up-moving-means, for mutual displacement between the cleaning means and the die or other device with the holes or passages to be cleaned, whereby an accuracy of the length of the stepwise displacement is less than or equal to one-half of a smallest diameter of the holes or the passages to be cleaned.

As noted above, although the manufacturing of the pelletizing dies proposes utilizing accurately operating drilling devices, with thin through-holes or passages the drills may bend laterally during the drilling operation due to the elasticity of the drills and, consequently, some of the through holes may become somewhat oblique in orientation. But, during the cleaning in accordance with the method and apparatus of the present invention, no damage of the holes or passages takes place including those of even rather oblique orientation.

Furthermore, the device of the present invention for positioning the cleaning means is capable of effectively functioning despite the fact that the through holes are unprecisely located due to unprecise orientation of the drills.

In accordance with the present invention, the positioning of the cleaning means above the first die opening to be cleaned takes place manually, whereupon the actual cleaning means is put into operation and, sequentially, the cleaning operation of the single through-holes or passages in the die is automatically carried out.

It is also to be noted that, in accordance with the process of the present invention, it is not necessary for the holes or passages to have a tubular or conical shaped passage through the die, but the holes or passages may be composed of more cylindrical shaped portions of different diameters such as, for example, step-wise tapering openings or a mixture of any such openings and conically tapering openings.

In pelletizing dies for feed stuff material pellets, some 10,000 through 15,000 holes or passages are provided in each die. According to the invention, some 0.1–10 seconds of time is required for the cleaning of the single holes or passages by the process.

It is to be further noted that the aforementioned detecting means for enabling a detecting of a successful cleaning of the single holes or passages comprises mechanical, and, in particular, movable means or members against which the material and cleaning medium from the cleaned holes or passages abuts. By giving these a suitable suspension and shape, a certain throw-back of cleaning medium, such as water, against the rear end of the cleaned openings may be advantageously attained so as to provide for a simultaneous cleaning of the rear ends of the die holes or passages.

BRIEF DESCRIPTION OF THE DRAWINGS

Embodiments according to the invention are described in more detail in connection with the accompanying drawings, wherein.

DETAILED DESCRIPTION

Figure 1:
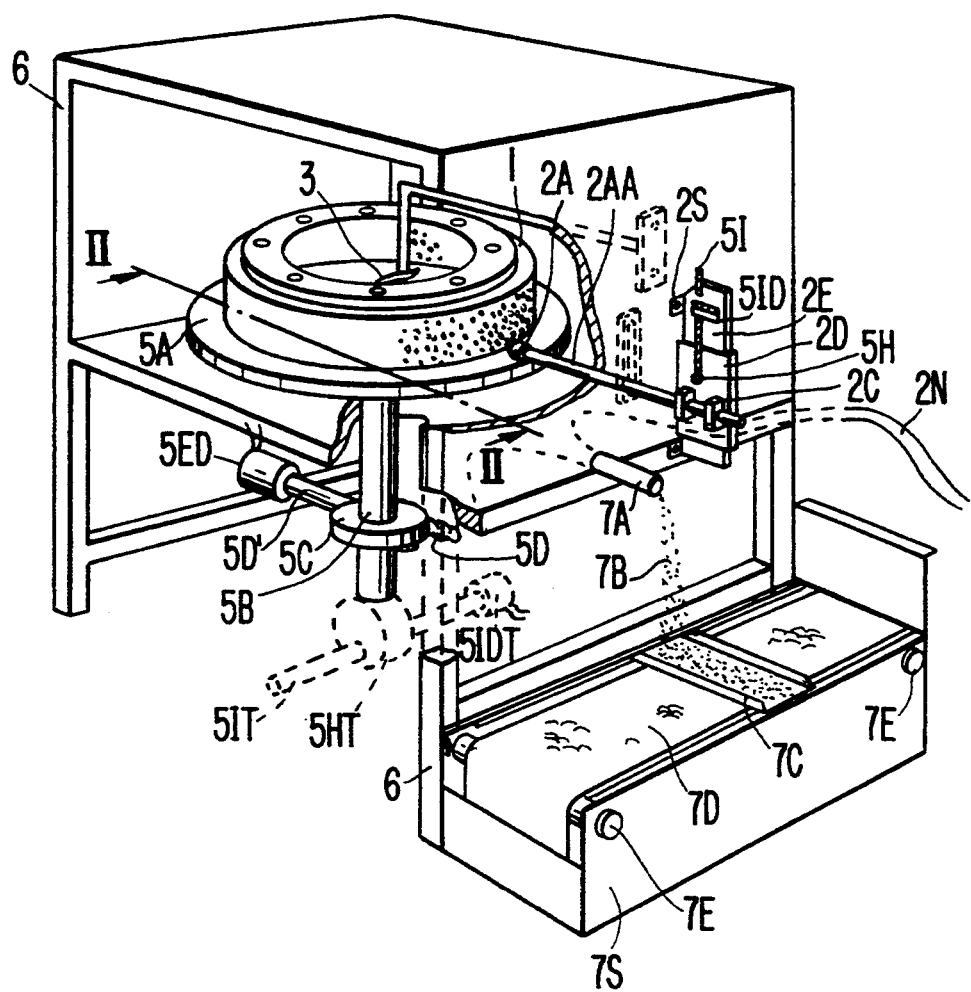
FIG. 1 is a perspective partially cut away schematic view of a water jet apparatus according to the present invention.

Referring now to the drawings wherein like reference numerals are used throughout the various views to designate like parts and, more particularly, to FIG. 1, according to this figure, a water jet apparatus for cleaning of clogged radially oriented through-passages, openings, holes or the like in a large cylindrical pelletizing die 1 of tempered steel material is, for example, mounted on a horizontally oriented turn table 5A to which, for example, the die 1 is rigidly fastened with, for example, conventional fastening means (not shown) to perform a rigid fastening of the die 1 to the table 5A and to maintain the position of the die 1 on the table 5A when the die 1 is subjected to a large pressure exerted through the water jets arriving at the die 1 from a nozzle 2A on a lance 2AA.

The turntable 5A sits on a rotary shaft 5B carried by bearings (not shown). In principle, the table 5A may be displaceable in an upward and downward direction at its bearings by resting on a periphery of an eccentric disc 5HT cooperable with an end of the rotary shaft 5B. The eccentric disc 5HT is arranged so as to be perpendicular to the end of the shaft 5B, with the shaft 5IT, upon which the eccentric disc 5HT is mounted, being supported by bearings (not shown) and being driven by a stepping motor 5IDT. The stepping motor 5IDT includes a gear means (not shown) so as to enable the eccentric disc 5HT to provide an upward and downward displacement of the table 5A. While such displacement can be effected, it is not well suited because the die 1 including the table 5A is of a considerable weight, such as, for example, 40–700 kg. Thus, it is considerably more advantageous to displace the nozzle 2A in an upward and downward direction rather than the table 5A with the displacement of the nozzle 2A being accomplished by arranging the lance 2B so as to be displaceable in an upward and downward direction. Since considerable forces are provided by the water jet from the nozzle 2A between the nozzle 2A and the die 1 it is necessary to provide a rather rigid guiding means to ensure a mechanical holding of the nozzle 2A with respect to the die 1 fastened on the table 5A.

To enable a turning of the table 5A carrying the die 1, the shaft 5B is provided with a worm wheel 5C rotated by a worm 5D located on a driving shaft 5D' driven through gear means (not shown) by, for example, a stepping motor 5ED.

To provide an upward and downward displacement of the nozzle 2A, the lance 2AA is rigidly fastened by clamps 2C such as, for example, U-shaped or C-shaped plate means 2D arranged so as to be displaceable in an upward and downward direction on a rail 2E serving as a holding means which, through further suitable fastening means, is located on a supporting means 6 which also serves to properly fasten the table 5A and the drive means associated with table 5A.

The supporting means 6 is illustrated as a rigid box supported on four legs defining a cavity. A front of the rigid box is closed by a door or cover plate (not shown) which serves to catch water discharged from the nozzle 2A and clogging matter released from the cleaned holes or passages, and to protect the surroundings against water or any other medium sprayed such as in a powder shaped spray, ejected from the nozzle 2A.

To provide for an upward and downward displacement of the nozzle 2A, for example a threaded shaft 5I is provided which, at one end, is fixedly maintained in place by a bearing 5H at the plate means 2D and, at the other end, is rotatably mounted by an internally threaded bearing means such as, for example, the hub of a toothed wheel driven by drive motor 5ID which, for example, may be a stepping motor incorporating a gear means (not shown) disposed between the drive motor 5ID and the toothed wheel.

In the embodiment of FIG. 1, the nozzle 2A is connected through a lance 2AA to a pressurized water producing compressor device (not shown). The stepping motors may be electrical stepping motors connected to a control unit (not shown) issuing the necessary control signals able to control and drive the stepping motors. This electrical control unit may also comprise a memory device or other control means connected to a signaling or detecting means 3 described hereinbelow in connection with FIG. 4 and illustrated in FIG. 1 and through which the stepwise displacement of the die 1 and the nozzle 2A are provided.

Figure 2:
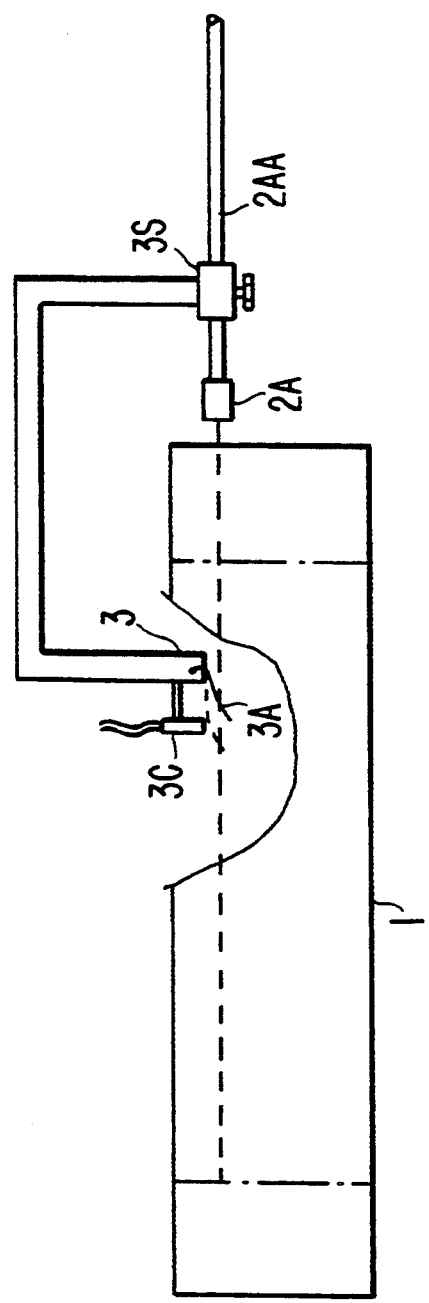
FIG. 2 is a front view taken along the line II—II in FIG. 1 illustrating a detecting means supported by a lance of a nozzle, and with a portion of the die to be cleaned cut away for a better view of the detecting means.

FIG. 2 provides an example of a different manner of fastening the detecting means 3. In FIG. 2, the phantom line piercing the die 1 represents a water jet from the nozzle 2A together with the ejected clogging material from the hole or passage in the die 1 which, in FIG. 2, strikes, for example, a plate member 3A pivotably suspended for displacement around a horizontal axis. Movement of the plate member 3A activates an electric switch or signal means for a period of time corresponding to the period of time the water jet passes through the detecting means 3.

The stepwise mutual displacement between the nozzle 2A and the die 1 is so adapted that a mutual movement is permitted with an accuracy which is better than equal to one-half of the smallest diameter of the holes or passages in concern, as measured from a center of a cleaned hole or passage to the next hole or passage to be cleaned and which hole or passage generally, for a given direction of moving, simultaneously is the nearest hole or passage.

It has been experimentally determined that a positioning of the holes or passages of a die 1 in front of the nozzle 2A with the accuracy obtained by the present invention, then further implementing of the cleaning process of the present invention is more advantageous when the die 1 by virtue of its suspension and the nozzle 2A by virtue of its suspension are arranged in the manner described hereinabove. This possible drive means enables the stepwise displacement mutually caused by the suspension and drive means are maintained in position elastically, elastomerically or, to a degree, by a spring means, with an accuracy which permits a mutual self-moving of these members with an amount of this self movement being within the size of one-half of the diameter of the smallest hole or passage to be cleaned in the die 1. In this manner, the water jet from the nozzle 2A is provided with the possibility through its unavoidable mutual influence of movement existing between the die 1 and the nozzle 2A so as to enable a centering of the water jet within the single holes or passages to be cleaned.

As shown in FIG. 2, detecting means 3 is maintained in position by suitable strong holding means 3S at the lance 2AA. It has been experimentally determined that the detecting means 3 is securely maintained in position by, for example, a phosphor bronze ribbon having a width of 10–30 mm and a thickness of 2–5 mm.

Figure 3:
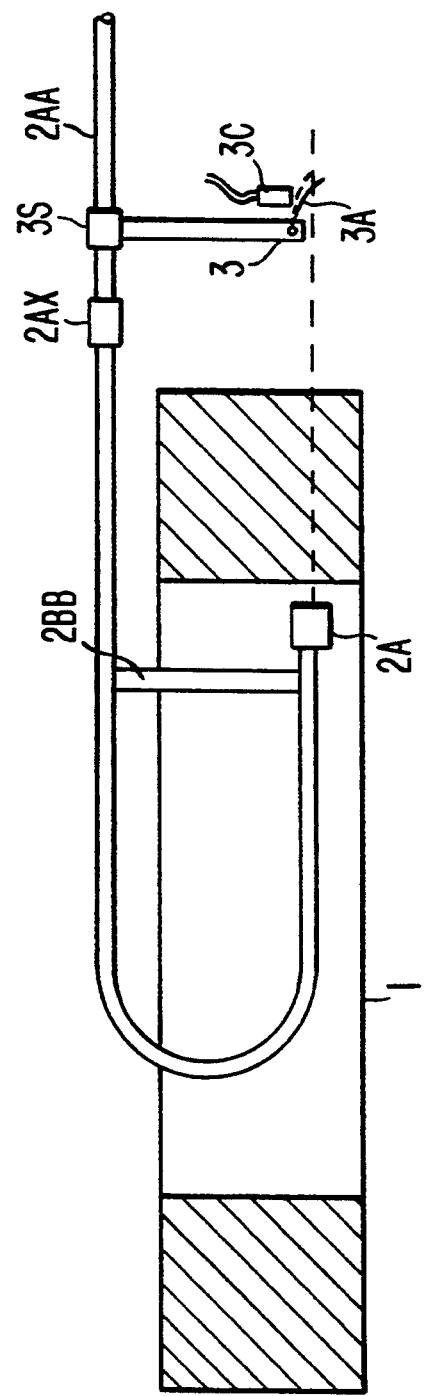
FIG. 3 is a cross-sectional view similar to FIG. 2 but depicting a section closer to a center of the die and illustrating a variation of the apparatus according to FIGS. 1 and 2 suitable for cleaning of holes in a die and incorporating a cleaning action taking place in an opposite direction.

In the embodiment of FIG. 3, the nozzle of FIG. 2 is replaced by, for example, a suitable coupling including a rigid tube joining means 2AX to bring the lance 2AA to extend the nozzle 2A which, in this case, is arranged so as to be turned against the internal wall of the die 1. To obtain a smooth water jet, that is, a water jet not ejected as a swirling water jet, a lance 2AA, having a greater length is shaped so as to have a straight length beneath the nozzle 2A. To ensure a suitable fastening of the nozzle 2A, a connecting strut member 2BB is provided for the lance 2D. In this case, the water jet from the nozzle 2A passes through the die 1 in a direction opposite to a direction of the embodiment of FIGS. 1 and 2.

With dies having very long and narrow holes or passages, for example, lengths greater than 15 cm and diameters of holes or passages less than 5 mm, it may be necessary to carry out a cleaning operation in both directions through the holes or passages to ensure that all clogging matter or remnants thereof is removed from the holes or passages, because an avoidable returning jet from the water jet at the passage through the narrow holes or passages makes it difficult to achieve a full-cleaning of single holes or passages over an entire length thereof.

Figure 4:
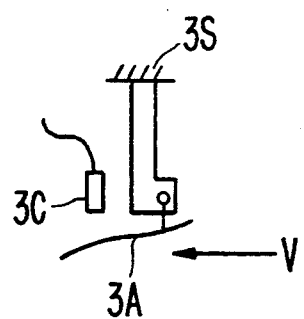
FIG. 4 is a detail view of a detecting means of FIGS. 1-3.

FIG. 4 provides another example of a detecting means. In FIG. 4, the suspension 3S is only schematically indicated; however, as shown in FIG. 4, the pivotable plate means 3A is somewhat S-shaped. The S-shaped configuration has demonstrated itself to be advantageous with respect to the water jet indicated by an arrow V. Through this embodiment two advantages are attained, namely, the influence of the water jet mechanically eroding or removing the material upon which the jet impinges is counteracted, and thus a smaller amount of erosion is achieved. Additionally, since the water jet hits the pivotable plate means 3A, the jet is deflected into various different directions in a sprinkling effect. The sprinkling effect is effective to suitably rinse the surface of the dies 1 which have become soiled by being covered with the feed pellet material when the dies 1 were used for pelletizing. Thus, the surroundings of the holes or passages are cleaned for removing adherent pellet material. This effect is, in particular, advantageous when the detecting means 3 with the pivotable plate means 3A is located at the open inner range of the die 1.

As shown in FIG. 1, the material being processed is caught by the housing 6 and, within the housing 6, is led to an outlet tube 7A and, in the shape of a spray 7B, to a water cleaning filter 7D and through a collecting channel 7C. The water cleaning filter 7D traps solid particles and is capable of being turned in a forward direction by driving rolls 7E arranged at a box 7S associated with the water cleaning filter 7D. Water, having passed through the apparatus and the die 1, from the very hot condition existing for the arriving mixture and clogging matter is, for example, led to a cooling device such as, for example, a cooling tower, and from there to a water supply capable of delivering water for a renewed passage through a compressor device so as to pass the recycled water through the nozzle 2A and produce a water jet exhibiting very high water pressure. The provided water jet then only has a thickness of approximately the size of one-half of the smallest hole or passage to be cleaned by the apparatus of the invention.

To achieve a cleaning of the external ranges of the holes or passages when performing a cleaning operation, it may be advantageous, at least at one end of the holes or passages, to perform an after drilling of these external ranges by employing, for example, a countersinking apparatus.

Figure 5:
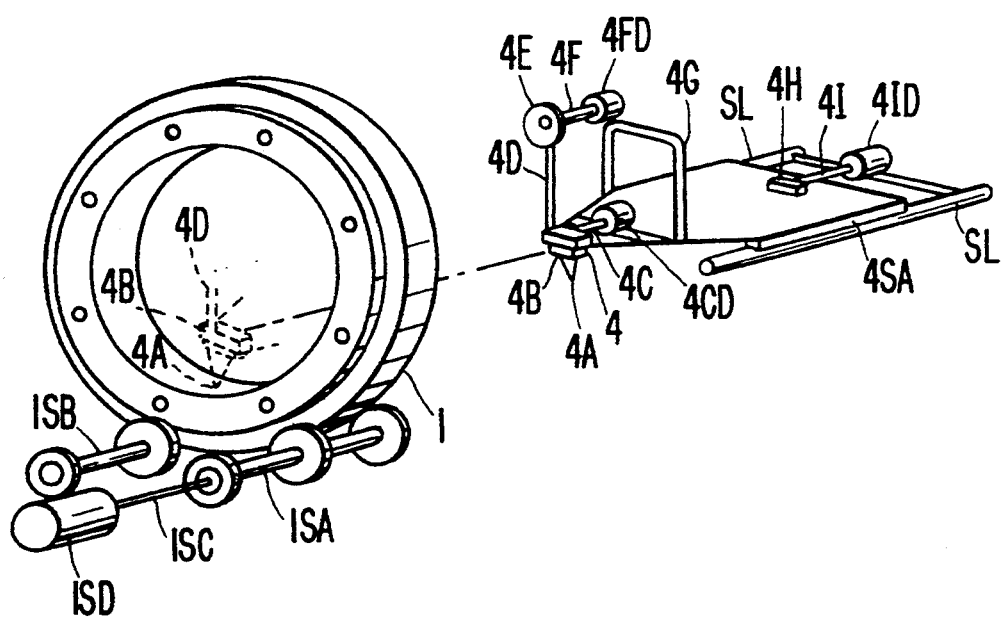
FIG. 5 is an exploded perspective view of a through drill-cleaning operation apparatus according to the present invention.

More particularly, as shown in FIG. 5 a drill 4A is bearing supported by a holding means 4D and is driven by a drilling drive means 4CD through a shaft 4C and through a gear means (not shown) which, for example, may be located in the holding means 4B. The holding means 4B permits, through a means 4D for upwardly and downwardly displacing the holding means 4B a corresponding upward and downward movement of the drill 4A controlled by a plate shaped eccentric means 4E located on a shaft 4F driven by stepping motor 4FD. The stepping motor 4FD is carried by a supporting means 4G which, together with the holding means 4B and the drill drive motor 4CD, are displaceably mounted on rails SL so as to be movable through suitable sliding bearing means 4SA resting on the rails SL. A stepping motor 4ID, stationarily mounted on the rails SL, is, through gear means (not shown), and, for example, a threaded shaft 4I, cooperable with an internally threaded fitted hub provided toothwheel as a bearing 4H, adapted to drive the supporting means 4G to and fro on the rails SL. The portion 4 of the apparatus can, as shown in FIG. 2 be positioned within a die 1. The die 1 rests between two supporting plate means located on two, horizontally oriented, shafts 1SA and 1SB, with the shaft 1SA, through a shaft extension 1SC, being capable of being rotated by a stepping motor 1SD through, for example, a gear means (not shown).

The stepping motors 1SD and 4ID correspond to the stepping motors 5ED and 4ID of the construction of FIG. 1 and, consequently, provide a mutual displacement between the drill 4A and the nozzle 2A, and the holes or passages to be cleaned in the die 1. The mutual displacement may, in both cases, be controlled in the same manner in that the detecting means 3, when employing a drill 4A, is replaced by a corresponding detector means which, for example, is mounted so that it is connected with the means 4D or with the plate shaped eccentric means 4E, with the corresponding detecting means providing an indication of a successful drill cleaning operation when cleaning the individual holes or passages of the die 1. When employing this type of detecting, mutual step-wise displacement between the working means or drill 4A and the die 1 to achieve positioning is provided in the same manner as described above, so as to attain the required positioning for carrying out cleaning of the next hole or passage of the die 1.

Without specifically describing details, a conventional counter may be used for counting the number of cleaned holes or passages, whereby the counting is carried out in one direction or the other, for example, around, along or across the ring shape of the die 1, that is, a successive counting of cleaned holes or passages may be carried out until a predetermined number of holes or passages is reached, whereafter, the cleaning operation is then brought to continue with another successive row of holes or passages along or across the ring shape of the die, etc.

It has been noticed that, experience shows that only comparatively few cases are found, where ejected matter from a hole or from a passage hits the opposite wall in the die 1 so that part of the ejected matter is able to penetrate into the hole or passage and clog the same. Thus, experience shows that subjecting the die to pressurized air after carrying out the described cleaning process according to the present invention, in practice, removes all remaining matter from the holes or passages including such matter which, during the cleaning operation, was caused to adhere in the holes or passages again.

We claim:

1. A process for cleaning an object having a plurality of small diameter clogged holes or passages the process comprising the steps of:
   locating the object on a supporting means;
   flexibly fastening the object to the supporting means by a holding means so as to enable a fastening of the object with respect to the supporting means;
   selectively adjusting a position of the object with respect to said supporting means by a position adjusting means with an accuracy of the positioning being within at least one-half of the smallest diameter of the hole or passage;
   directing a cleaning means including at least a water jet having a diameter less than one-half of the smallest diameter in a longitudinal direction of a first hole or passage to be cleaned;
   maintaining a degree of fixation between the object and the supporting means so as to enable a mutual movement between the object and the supporting means to be less than one-half the smallest diameter of the hole or passage in the object;
   detecting an arrival of at least one of water and clogged material from a rear end of the respective holes or passages and activating a memory means resulting in either a cleaning operation stoppage or effecting a mutual displacement between the object and the supporting means by said position adjusting means for the displacing one of said objects or said water jet corresponding to a mutual spacing between a center of a cleaned hole or passage and a center of an adjacent hole or passage to be cleaned with an accuracy of the displacement being at least one-half of the smallest diameter of the hole or passage and with the water jet being directed so as to be oriented in a longitudinal direction of the respective holes or passages; and continuing the process for the respective holes or passages until all of the holes or passages are cleaned.

2. Process according to claim 1, wherein a drilling means adapted to clean one end of the respective holes or passages is provided, and wherein the detecting means is adapted to detect a termination of a cleaning of the the holes or passages.

3. Process according to claim 1, wherein the cleaning water jet is adapted to be directed through the holes or passages in either direction.

4. Process according to claim 1, wherein the cleaning water jet under an extremely high pressure is emitted from a nozzle at approximately supersonic speed with respect to the surrounding atmosphere around the area to be cleaned.

5. Process according to claim 1, wherein the memory means, upon not detecting emissions of one of water or clogging material from the respective holes or passages, after a time period of operation produces an output signal to to one of continuing or stopping the process.

6. Process according to claim 5, wherein the the time period of operation is ten to thirty an expected operational cleaning time per hole, and wherein the memory means comprises means for one of up-counting and determining a frequency of an occurrence of incomplete cleaning of the respective holes or passages and providing an alarm signal of incomplete cleaning and issuing output signals for stopping the cleaning operation.

7. Process according to claim 2 further comprising the step of transferring the object from one apparatus to at least one further apparatus, with the at least one apparatus providing the water jet cleaning of the holes or passages and at least one other apparatus providing the drilling means.

8. An apparatus for cleaning an object having a plurality of small diameter clogged holes or passages by a cleaning means, with the object being located on a supporting means, the apparatus comprising holding means for flexible fastening the object to the supporting means so as to enable a fastening of the object with respect to the cleaning means;

position adjusting means for selectively adjusting a position of the object with respect to said cleaning means with an accuracy of the positioning being within at least one-half of the smallest diameter of the hole or passage;

said cleaning means including at least a water jet having a diameter less than one-half of the smallest diameter directed in a longitudinal direction of a first hole or passage to be cleaned;

means for maintaining a degree of fixation between the object and the cleaning means so as to enable mutual movement between the object and the cleaning means to be less than one-half the smallest diameter of the hole or passage in the object;

detecting means for detecting an arrival of at least one of water and clogged material from a rear end of the respective holes or passages and activating a memory means resulting in either a cleaning operation stoppage or effecting a mutual displacement between the object and the cleaning means by said position adjusting means for displacing one of said object or said water jet corresponding to a mutual spacing between a center of a cleaned hole or passage and a center of an adjacent hole or passage to be cleaned with an accuracy of displacement being at least one-half of the smallest diameter of the hole or passage and with the water jet being directed so as to be oriented in a longitudinal direction of the respective holes or passages, and wherein the apparatus, in more than one plane, comprises means for moving the supporting means in a stepwise manner for enabling a mutual displacement between the cleaning means and the object, whereby an accuracy of a length of the steps is less than or equal to one-half of a smallest diameter of the holes or passages to be cleaned, the mutual displacement between the cleaning mean and the object being continued until all of the holes or passages are cleaned.

9. Apparatus according to claim 8, wherein the detecting means enable a detecting of an achieved cleaning of the individual holes or passages and includes movable means against which material from the clogged holes or passages and cleaning medium from the cleaned holes or passages are brought into abutment.

10. Apparatus according to claim 9, wherein the detecting means includes a S-shaped pivotable member pivotably supported by a suspension member.

* * * * *